US012713291B2

(12) United States Patent
Ji et al.

(10) Patent No.: US 12,713,291 B2
(45) Date of Patent: Aug. 18, 2026

(54) SYSTEMS AND METHODS OF PRIORITIZED DATA DISCARD FOR WIRELESS COMMUNICATION

(71) Applicant: Meta Platforms Technologies, LLC, Menlo Park, CA (US)

(72) Inventors: Zhu Ji, Cupertino, CA (US); Curt Wong, Bellevue, WA (US); Yee Sin Chan, San Francisco, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 200 days.

(21) Appl. No.: 18/413,751

(22) Filed: Jan. 16, 2024

(65) Prior Publication Data

US 2024/0259869 A1 Aug. 1, 2024

Related U.S. Application Data

(60) Provisional application No. 63/442,685, filed on Feb. 1, 2023.

(51) Int. Cl.
*G06F 13/00* (2006.01)
*H04W 28/02* (2009.01)
*H04W 28/06* (2009.01)

(52) U.S. Cl.
CPC ....... *H04W 28/06* (2013.01); *H04W 28/0289* (2013.01)

(58) Field of Classification Search
CPC .. H04W 28/06; H04W 28/0289; H04L 47/24; H04L 47/283; H04L 47/32
USPC ................................ 709/235, 234, 232, 238
See application file for complete search history.

(56) References Cited

U.S. PATENT DOCUMENTS 9,560,684 B2 * 1/2017 Sivanesan ............. H04L 5/0048
11,159,981 B2 * 10/2021 Shi .......................... H04L 47/32
2015/0085667 A1 * 3/2015 Sivanesan ............. H04W 76/38 370/237
2020/0334469 A1 * 10/2020 Yu .......................... G06V 10/96
2020/0413288 A1 * 12/2020 Shi .......................... H04L 47/32
2025/0055806 A1 * 2/2025 Yu .......................... H04L 47/11

FOREIGN PATENT DOCUMENTS

CN 119316878 A * 1/2025 ........ H04W 28/0289
WO WO-2024073967 A1 * 4/2024 ............ H04L 47/32

OTHER PUBLICATIONS

English translation of CN-119316878-A.*

* cited by examiner

*Primary Examiner* — Kenneth R Coulter
(74) *Attorney, Agent, or Firm* — Foley & Lardner LLP

(57) ABSTRACT

Disclosed herein are aspects related to a device that can include a wireless communication interface and one or more processors. The one or more processors can detect a congestion condition for communication of a data flow having a first data element and a second data element. the first data element can have a first importance score, and the second data element having a second importance score less than the first importance score. The one or more processors can cause, responsive to detecting the congestion condition, for communication of the data flow, discard of at least a portion of the second data element.

20 Claims, 7 Drawing Sheets

SYSTEMS AND METHODS OF PRIORITIZED DATA DISCARD FOR WIRELESS COMMUNICATION

CROSS-REFERENCE TO RELATED APPLICATIONS

The present application claims the benefit of and priority to U.S. Provisional Application No. 63/442,685, filed Feb. 1, 2023, the disclosure of which is incorporated herein by reference in its entirety.

FIELD OF DISCLOSURE

The present disclosure is generally related to communication for rendering artificial, mixed, virtual, or extended reality, including but not limited to systems and methods for systems and methods of prioritized data discard for wireless communication.

BACKGROUND

Artificial/extended reality (XR) such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

SUMMARY

Systems that implement XR can transmit data to and receive data from remote devices, such as network base stations, as part of providing XR experiences. Due to various factors including size, weight, and power considerations, it can be useful for such systems, such as portable user equipment (UE) devices, to control prioritization of communication of data (e.g., of protocol data units (PDUs)) in a manner reflective of how the data is to be used. However, such control can affect quality of service (QoS) of the XR experience, such as by affecting latency; similarly, XR data, such as video frames to be presented in an order, may be expected to be delivered according to a periodic schedule (e.g., frame rate), and thus such systems can cause data to be discarded rather than transmitted/received after the data would be useful, which can affect (e.g., reduce) QoS.

Systems and methods in accordance with the present disclosure can allow for more effective communication of network data, including XR data, by performing targeted selection of data of PDU sets to be discarded, such as under congestion conditions. For example, systems and methods in accordance with the present disclosure can perform the selection of data to be discarded based at least on importance scores of the PDU sets of a QoS flow. In some implementations, the system uses the importance score to perform a weighted discarding, such as by determining a portion (e.g., percentage) of a given PDU set to discard based at least on the importance score, such as based at least on a value or level of the importance score relative to other importance scores of PDU sets of the QoS flow. By using the importance scores to determine whether to discard data of PDU sets and/or how much data of PDU sets to discard, systems and methods in accordance with the present disclosure can facilitate transmission of data in a manner that can allow for data recovery processes (e.g., as implemented by at least one of an application that generates the data or an application to receive the generated data) to be more effective (e.g., to have a greater likelihood of recovering discarded data by interpolation or other recovery processes).

Various implementations disclosed herein are related to a device that can include a wireless communication interface and one or more processors. The one or more processors can detect a congestion condition for communication of a data flow having a first data element and a second data element. the first data element can have a first importance score, and the second data element having a second importance score less than the first importance score. The one or more processors can cause, responsive to detecting the congestion condition, for communication of the data flow by the wireless communication interface, discard of at least a portion of the second data element.

In some implementations, the one or more processors are to detect the congestion condition according to at least one of a latency metric, a jitter metric, or a buffer metric. In some implementations, the one or more processors are implemented by at least one of a user equipment device or a network device. The data flow can include a plurality of data packets for sequential communication, each of the data packets comprising a respective first data element and second data element. The data flow can be a quality of service (QoS) flow.

In some implementations, the one or more processors are to cause the discard by selecting a portion of each data element to discard according to a weighting criteria. The one or more processors can generate the data flow by retrieving the first data element from a first protocol data unit (PDU) set and retrieving the second data element from a second PDU set.

In some implementations, the first data element includes a P frame of an image, and the second data element includes an I frame of the image. In some implementations, the first data element represents video information, and the second data element represents audio information. In some implementations, the one or more processors are to assign the QoS flow to a same packet data convergence protocol (PDCP) layer responsive to assigning the first data element and the second data element to the QoS flow. The one or more processors can perform the discard of at least the portion of the second data element at the PDCP layer.

Various implementations disclosed herein relate to a system that can include one or more processors. The one or more processors can detect a discard condition for communication of a quality of service (QoS) data flow having a first protocol data unit (PDU) set and a second PDU set. the first PDU set can have a first importance, and the second PDU set can have a second importance less than the first importance. The one or more processors can cause, responsive to detecting the discard condition and based at least on the second importance being less than the first importance, for communication of the data flow, discard of at least a portion of the second PDU set.

In some implementations, the one or more processors are to detect the discard condition according to at least one of a latency metric, a jitter metric, or a metric for an amount of time for maintaining the first PDU set and the second PDU set in a buffer for transmission. In some implementations, the one or more processors are implemented by at least one of a user equipment device or a network device.

In some implementations, the one or more processors are to cause the discard by selecting the portion of the second PDU set to discard according to a weighting criteria associated with the second importance. The first PDU set can include a P frame of an image, and the second PDU set can include at least one of an I frame of the image or audio data associated with the image. The first PDU set can represent video information, and the second PDU set can represent audio information.

In some implementations, the one or more processors are to assign the QoS flow to a same packet data convergence protocol (PDCP) layer responsive to assigning the first PDU set and the second PDU set to the QoS flow. The one or more processors can perform the discard of at least the portion of the second PDU set at the PDCP layer.

Various implementations disclosed herein relate to a method. The method can include detecting, by one or more processors, a discard condition for communication of a quality of service (QoS) data flow having a first protocol data unit (PDU) set and a second PDU set, the first PDU set having a first importance, the second PDU set having a second importance less than the first importance. The method can include causing, responsive to detecting the congestion condition, for communication of the data flow, discard of at least a portion of the second PDU set.

In some implementations, detecting the congestion condition includes evaluating, relative to at least one threshold, at least one of a latency metric, a jitter metric, or a buffer metric. In some implementations, the method includes randomly selecting, by the one or more processors, the portion of the second PDU set to discard according to a discard rate associated with the second importance score.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
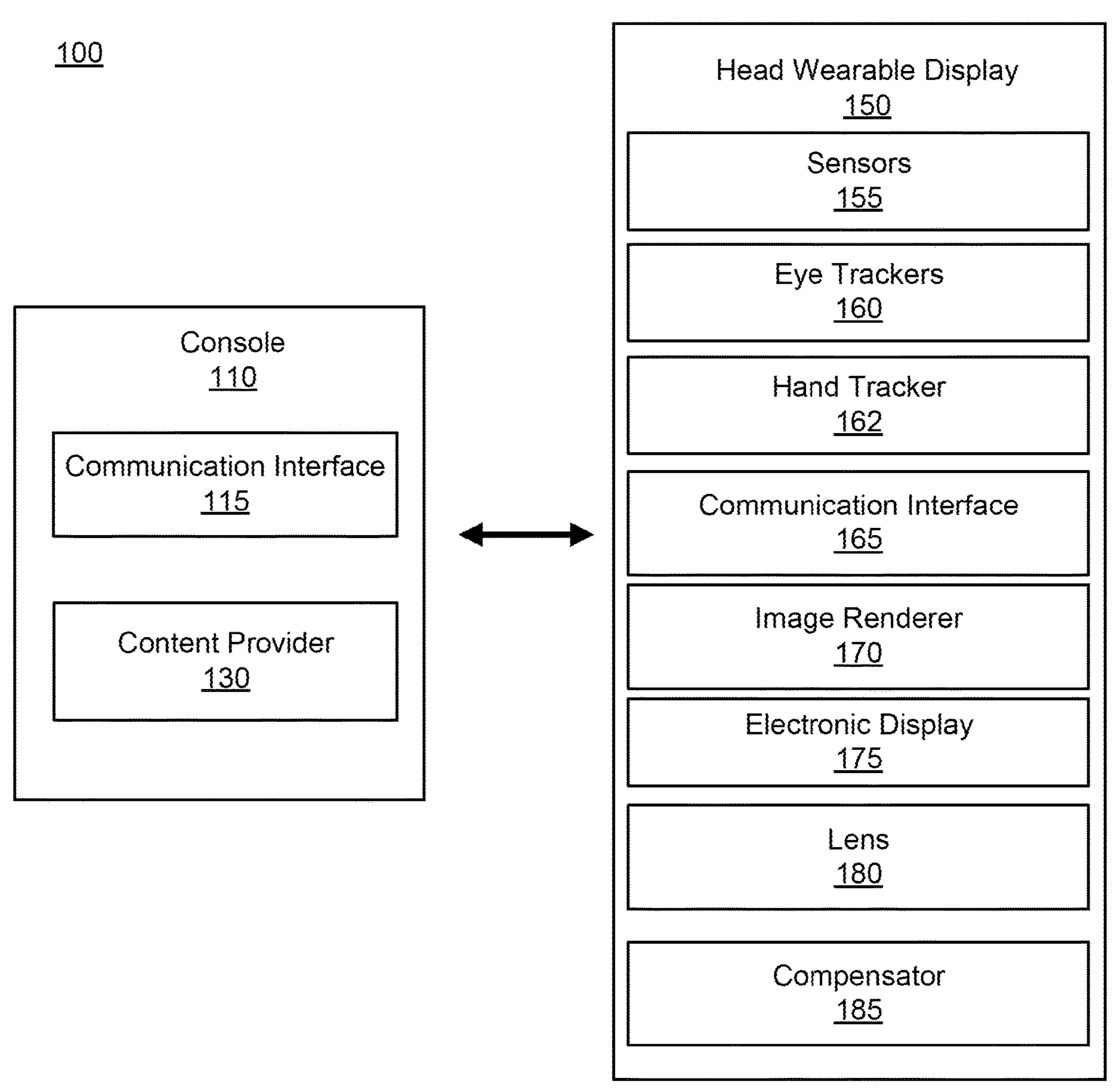
FIG. 1 is a diagram of a system environment including an artificial reality system, according to an example implementation of the present disclosure.

Before turning to the figures, which illustrate certain implementations in detail, it should be understood that the present disclosure is not limited to the details or methodology set forth in the description or illustrated in the figures. It should also be understood that the terminology used herein is for the purpose of description only and should not be regarded as limiting.

Systems and methods in accordance with the present disclosure are related to a communication system that can perform prioritized discarding of data, including for data elements (e.g., data packets) for XR data. Some communication systems can map data packets from multiple paths into a single path, such as to assign multiple protocol data unit (PDU) sets to a quality of service (QoS) flow. This can enable the communication systems to more efficiently arrange data for processing by receiving devices or components, such as for processing by one or more applications of an application layer. In some instances, the multiple data packets may have similar or identical latency and/or jitter criteria. However, under congestion conditions, it may be difficult to properly communicate the data mapped to the QoS flow; for example, at least one portion of a communication path may not have sufficient bandwidth to communicate the data, such as if a buffer has reached a threshold capacity, or if it may not be likely or possible to communicate at least a subset (or all) of the data of the QoS flow in accordance with latency and/or jitter criteria due to the congestion.

A PDU set can include one or more PDU(s) that includes a payload of a unit of information generated at an application level, such as a frame or video slice for XR or extended reality management (XRM) services. In some implementations, all PDUs in a PDU set may be needed by the application layer to use the corresponding unit of information, or the application layer may be capable of recovering parts of or all of the information unit even if some PDUs are missing. Applications can output multiple PDUs as a data burst (e.g., one or more PDU sets). For example, a transmitter may send PDUs as a data burst, where a set of multiple PDUs are generated and sent by an application in a short period of time (or burst). Each data burst can be composed of multiple PDU sets. A given PDU to be outputted by an entity (e.g., by a layer of the Open Systems Interconnection (OSI) model) can correspond to a service data unit (SDU) received by the entity; the entity can modify the SDU, such as to encapsulate at least a portion of the SDU with control information for controlling how the SDU is to be communicated, to form the PDU. For example, a given layer can receive an SDU from the application layer, and output a PDU corresponding to the received SDU.

Various quality of services (QoS) rules and/or classifications may be applied to network data traffic (e.g., an IP flow), including PDUs and data bursts. For example, UL/DL traffic classification can be based on packet detection rules for DL and/or a UL traffic filter for UL; various tuples (e.g., source IP, destination IP, source port, destination port, protocol ID) can be used to perform the classification.

With respect to PDUs, a PDU set delay budget (PSDB) can define an upper bound for an amount of time that a PDU set may be delayed between particular points in a network pathway, such as between a device (e.g., user equipment (UE), such as various devices described herein) and an N6 point at a user plane function (UPF). For example, the PDSB can be applied to a DL PDU set received by the UPF over the N6 interface, and to the UL PDU sent by the UE. In the case of network access, the PSDB can support the configuration of scheduling and link layer functions (e.g., the setting of scheduling priority weights and hybrid automatic repeat request (HARQ) target operating points). For a given 5G QoS identifier (5QI), which can indicate one or more QoS parameters or characteristics, the value of the PSDB can be the same for UL and DL. For some classifications of data (e.g., based on particular QoS rules to be applied to the data), a PDU set may be counted as lost if delayed more than the PSDB.

A PDU set discard time (PSDT) can define an upper bound for an amount of time that a PDU set has been waiting for transmission at the sender of a link layer protocol (e.g., RLC in RAN) before being discarded. The PSDT can apply to the DL PDU set received by the UPF over the N6 interface, and to the UL PDU set sent by the UE. The PDCP layer can perform discard of PDUs, such as based on timing criteria (e.g., PSDT, PSDB).

Systems and methods in accordance with the present disclosure can enable a device to discard data communicated on the path (e.g., discard data of a QoS flow) according to at least one criteria. The criteria can relate to a type of information represented by the data; for example, the criteria can include an importance criteria, which may indicate a priority for communicating various types or categories of information represented by the data. For example, responsive to a congestion condition being detected, the device can discard at least a portion of the QoS flow having a relatively low importance. This can enable the device to meet performance criteria and/or improve performance by mapping PDU sets to QoS flows and/or reduce latency that might otherwise result from delayed or improperly discarded data.

In some implementations, a device includes a wireless communications interface and one or more processors. The one or more processors can detect a congestion condition for communication of a communication flow, such as a QoS flow, having data corresponding to a plurality of PDU sets. Responsive to detecting the congestion condition, the one or more processors can identify a first data element of the QoS flow having a first value of an importance metric, can identify a second data element of the QoS flow having a second value of the importance metric, the second value indicating that the second data element is less important than the first data element, and can discard at least a portion of the second data element. The device can apply a weighted discard policy to discard (e.g., over a plurality of communication cycles), such as to discard relatively greater portions of data elements having lower values of the importance metrics than data elements having higher values. The data elements of the QoS flow can have the same or different latency and/or jitter criteria. The data elements of the QoS flow can be targeted for receipt by a same application, such as to be data elements of audio and/or video content (e.g., I/P images frames; audio and video data that are multiplexed).

Although various implementations disclosed herein are provided with respect to wearable devices, principles disclosed herein can be applied to any other type of devices such as handheld, mobile or small form factor devices (e.g., smart phones, tablet computers, laptops, etc.).

FIG. 1 is a block diagram of an example artificial reality system environment 100. In some implementations, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HDM 150, the detected shape, location and/or orientation of the body/hand/face of the user, and/or a user input for the artificial reality, and transmit the image data to the HWD 150 for presentation. In some implementations, the artificial reality system environment 100 includes more, fewer, or different components than shown in FIG. 1. In some implementations, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some implementations, the console 110 is integrated as part of the HWD 150.

In some implementations, the HWD 150 is an electronic component that can be worn by a user and can present or provide an artificial reality experience to the user. The HWD 150 may render one or more images, video, audio, or some combination thereof to provide the artificial reality experience to the user. In some implementations, audio is presented via an external device (e.g., speakers and/or headphones) that receives audio information from the HWD 150, the console 110, or both, and presents audio based on the audio information. In some implementations, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other implementations, the HWD 150 includes more, fewer, or different components than shown in FIG. 1.

In some implementations, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some implementations, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some implementations, the eye trackers 160 include electronic components or a combination of electronic components and software components that determine a gaze direction of the user of the HWD 150. In some implementations, the HWD 150, the console 110 or a combination of them may incorporate the gaze direction of the user of the HWD 150 to generate image data for artificial reality. In some implementations, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some implementations, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some implementations, a user of the HWD 150 can configure the HWD 150 (e.g., via user settings) to enable or disable the eye trackers 160. In some implementations, a user of the HWD 150 is prompted to enable or disable the eye trackers 160.

In some implementations, the hand tracker 162 includes an electronic component or a combination of an electronic component and a software component that tracks a hand of the user. In some implementations, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some implementations, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some implementations, the image renderer 170 includes an electronic component or a combination of an electronic component and a software component that generates one or more images for display, for example, according to a change in view of the space of the artificial reality. In some implementations, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some implementations, the image data from the console 110 may be encoded, and the image renderer 170 may decode the image data to render the image. In some implementations, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some implementations, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some implementations, the electronic display 175 is an electronic component that displays an image. The electronic display 175 may, for example, be a liquid crystal display or an organic light emitting diode display. The electronic display 175 may be a transparent display that allows the user to see through. In some implementations, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some implementations, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some implementations, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some implementations, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other implementations, the console 110 includes more, fewer, or different components than shown in FIG. 1. In some implementations, the console 110 is integrated as part of the HWD 150.

In some implementations, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some implementations, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some implementations, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some implementations, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
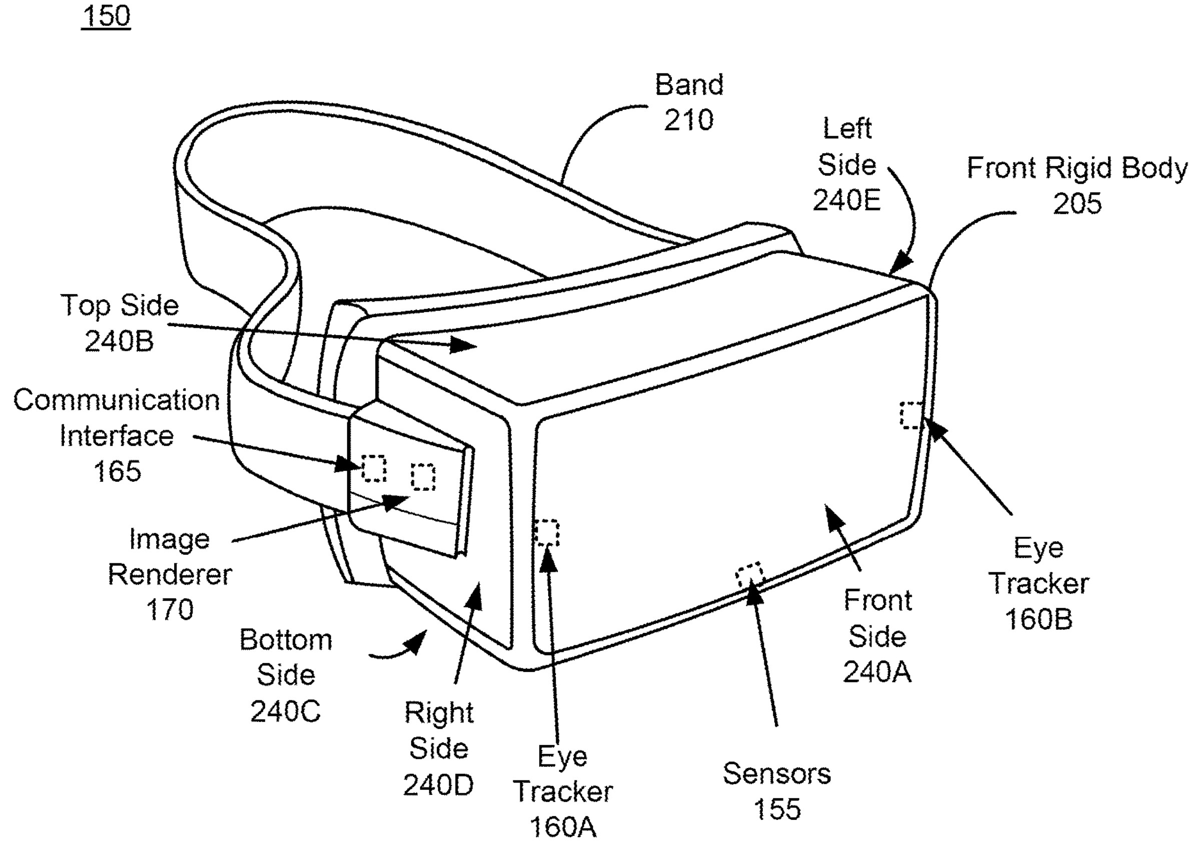
FIG. 2 is a diagram of a head wearable display, according to an example implementation of the present disclosure.

FIG. 2 is a diagram of a HWD 150, in accordance with an example implementation. In some implementations, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the implementation shown by FIG. 2, the communication interface 165, the image renderer 170, and the sensors 155 are located within the front rigid body 205, and may not be visible to the user. In other implementations, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
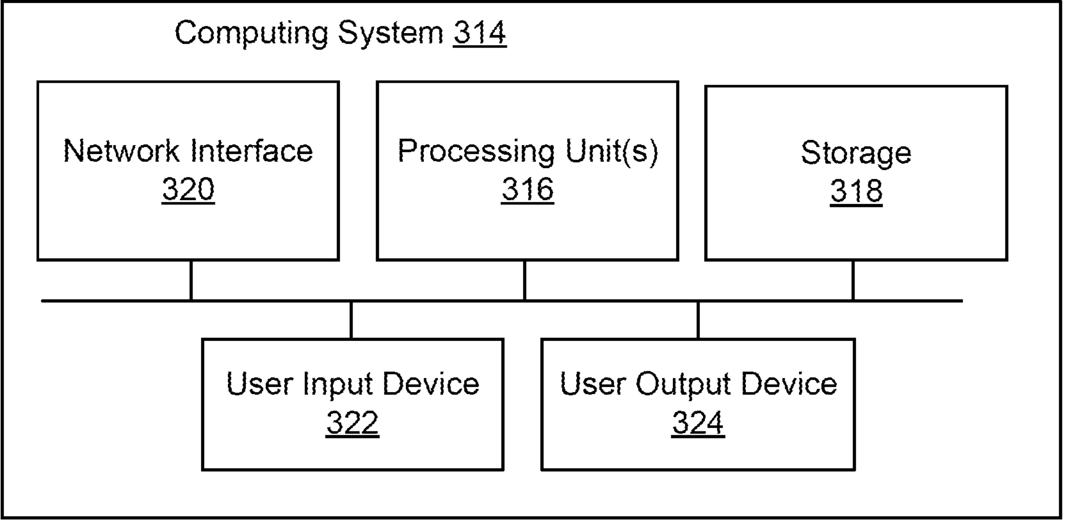
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some implementations, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some implementations, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 4:
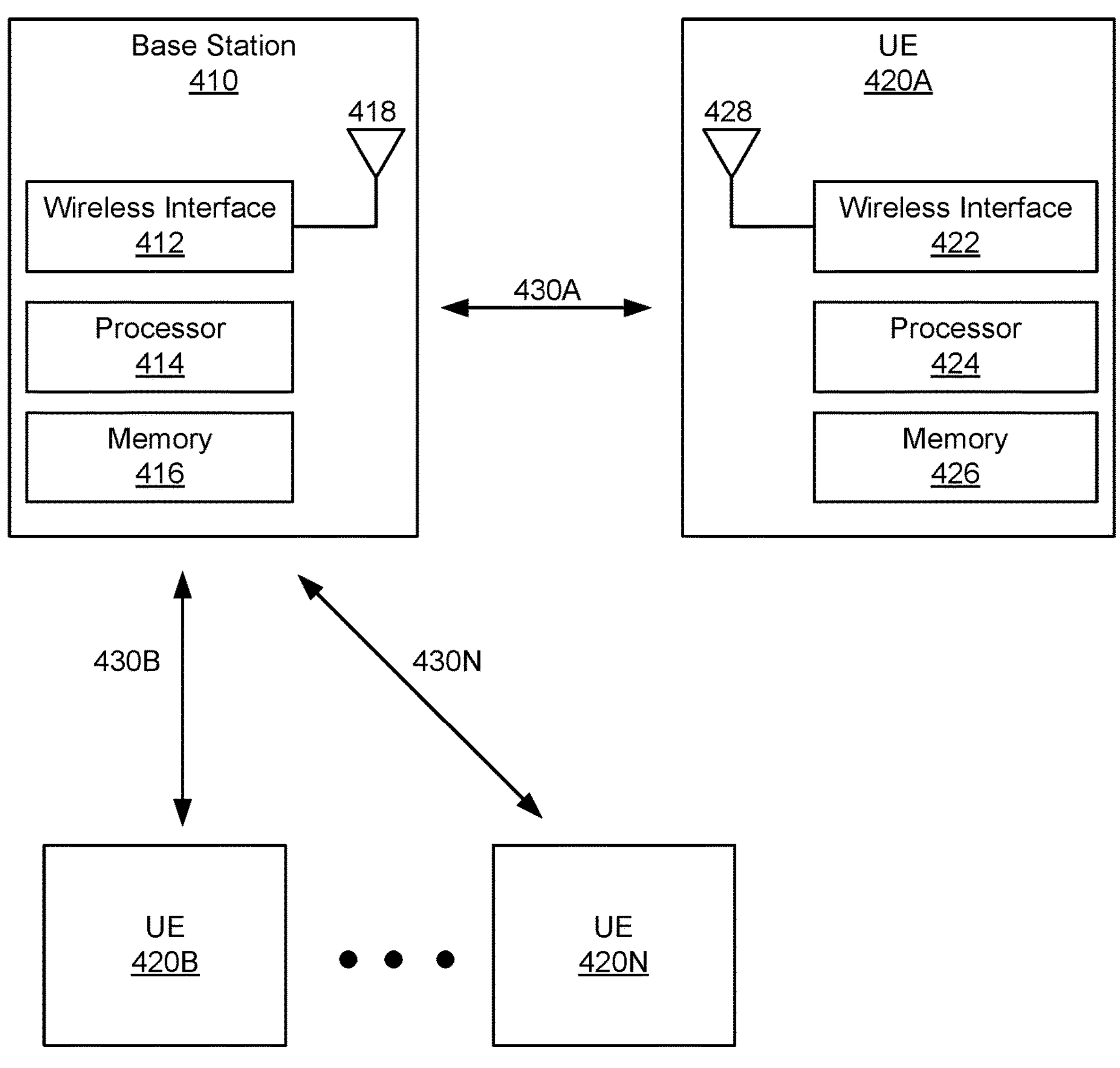
FIG. 4 is a diagram of an example wireless communication system, according to an example implementation of the present disclosure.

FIG. 4 illustrates an example wireless communication system 400. The wireless communication system 400 may include a base station 410 (also referred to as "a wireless communication node 410" or "a station 410") and one or more user equipment (UEs) 420 (also referred to as "wireless communication devices 420" or "terminal devices 420"). The UEs 420 may be or include any device or component described above with reference to FIG. 1-FIG. 3, such as the console 110, head wearable display 150, or the like. The base station 410 and UEs 420 may include components, elements, and/or hardware similar to those described above with reference to FIG. 1-FIG. 3. The base station 410 and the UEs 420 may communicate through wireless commination links 430A, 430B, 430C. The wireless communication link 430 may be a cellular communication link conforming to 3G, 4G, 5G or other cellular communication protocols or a Wi-Fi communication protocol. In one example, the wireless communication link 430 supports, employs or is based on an orthogonal frequency division multiple access (OFDMA). In one aspect, the UEs 420 are located within a geographical boundary with respect to the base station 410, and may communicate with or through the base station 410. In some implementations, the wireless communication system 400 includes more, fewer, or different components than shown in FIG. 4. For example, the wireless communication system 400 may include one or more additional base stations 410 than shown in FIG. 4.

In some implementations, the UE 420 may be a user device such as a mobile phone, a smart phone, a personal digital assistant (PDA), tablet, laptop computer, wearable computing device, etc. Each UE 420 may communicate with the base station 410 through a corresponding communication link 430. For example, the UE 420 may transmit data to a base station 410 through a wireless communication link 430, and receive data from the base station 410 through the wireless communication link 430. Example data may include audio data, image data, text, etc. Communication or transmission of data by the UE 420 to the base station 410 may be referred to as an uplink communication. Communication or reception of data by the UE 420 from the base station 410 may be referred to as a downlink communication. In some implementations, the UE 420A includes a wireless interface 422, a processor 424, a memory device 426, and one or more antennas 428. These components may be embodied as hardware, software, firmware, or a combination thereof. In some implementations, the UE 420A includes more, fewer, or different components than shown in FIG. 4. For example, the UE 420 may include an electronic display and/or an input device. For example, the UE 420 may include additional antennas 428 and wireless interfaces 422 than shown in FIG. 4.

The antenna 428 may be a component that receives a radio frequency (RF) signal and/or transmit a RF signal through a wireless medium. The RF signal may be at a frequency between 200 MHz to 100 GHz. The RF signal may have packets, symbols, or frames corresponding to data for communication. The antenna 428 may be a dipole antenna, a patch antenna, a ring antenna, or any suitable antenna for wireless communication. In one aspect, a single antenna 428 is utilized for both transmitting the RF signal and receiving the RF signal. In one aspect, different antennas 428 are utilized for transmitting the RF signal and receiving the RF signal. In one aspect, multiple antennas 428 are utilized to support multiple-in, multiple-out (MIMO) communication.

The wireless interface 422 includes or is embodied as a transceiver for transmitting and receiving RF signals through a wireless medium. The wireless interface 422 may communicate with a wireless interface 412 of the base station 410 through a wireless communication link 430A. In one configuration, the wireless interface 422 is coupled to one or more antennas 428. In one aspect, the wireless interface 422 may receive the RF signal at the RF frequency received through antenna 428, and downconvert the RF signal to a baseband frequency (e.g., 0-1 GHz). The wireless interface 422 may provide the downconverted signal to the processor 424. In one aspect, the wireless interface 422 may receive a baseband signal for transmission at a baseband frequency from the processor 424, and upconvert the baseband signal to generate a RF signal. The wireless interface 422 may transmit the RF signal through the antenna 428.

The processor 424 is a component that processes data. The processor 424 may be embodied as field programmable gate array (FPGA), application specific integrated circuit (ASIC), a logic circuit, etc. The processor 424 may obtain instructions from the memory device 426, and executes the instructions. In one aspect, the processor 424 may receive downconverted data at the baseband frequency from the wireless interface 422, and decode or process the downconverted data. For example, the processor 424 may generate audio data or image data according to the downconverted data, and present an audio indicated by the audio data and/or an image indicated by the image data to a user of the UE 420A. In one aspect, the processor 424 may generate or obtain data for transmission at the baseband frequency, and encode or process the data. For example, the processor 424 may encode or process image data or audio data at the baseband frequency, and provide the encoded or processed data to the wireless interface 422 for transmission.

The memory device 426 is a component that stores data. The memory device 426 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable for storing data. The memory device 426 may be embodied as a non-transitory computer readable medium storing instructions executable by the processor 424 to perform various functions of the UE 420A disclosed herein. In some implementations, the memory device 426 and the processor 424 are integrated as a single component.

In some implementations, each of the UEs 420B . . . 420N includes similar components of the UE 420A to communicate with the base station 410. Thus, detailed description of duplicated portion thereof is omitted herein for the sake of brevity.

In some implementations, the base station 410 may be an evolved node B (eNB), a serving eNB, a target eNB, a femto station, or a pico station. The base station 410 may be communicatively coupled to another base station 410 or other communication devices through a wireless communication link and/or a wired communication link. The base station 410 may receive data (or a RF signal) in an uplink communication from a UE 420. Additionally or alternatively, the base station 410 may provide data to another UE 420, another base station, or another communication device. Hence, the base station 410 allows communication among UEs 420 associated with the base station 410, or other UEs associated with different base stations. In some implementations, the base station 410 includes a wireless interface 412, a processor 414, a memory device 416, and one or more antennas 418. These components may be embodied as hardware, software, firmware, or a combination thereof. In some implementations, the base station 410 includes more, fewer, or different components than shown in FIG. 4. For example, the base station 410 may include an electronic display and/or an input device. For example, the base station 410 may include additional antennas 418 and wireless interfaces 412 than shown in FIG. 4.

The antenna 418 may be a component that receives a radio frequency (RF) signal and/or transmit a RF signal through a wireless medium. The antenna 418 may be a dipole antenna, a patch antenna, a ring antenna, or any suitable antenna for wireless communication. In one aspect, a single antenna 418 is utilized for both transmitting the RF signal and receiving the RF signal. In one aspect, different antennas 418 are utilized for transmitting the RF signal and receiving the RF signal. In one aspect, multiple antennas 418 are utilized to support multiple-in, multiple-out (MIMO) communication.

The wireless interface 412 includes or is embodied as a transceiver for transmitting and receiving RF signals through a wireless medium. The wireless interface 412 may communicate with a wireless interface 422 of the UE 420 through a wireless communication link 430. In one configuration, the wireless interface 412 is coupled to one or more antennas 418. In one aspect, the wireless interface 412 may receive the RF signal at the RF frequency received through antenna 418, and downconvert the RF signal to a baseband frequency (e.g., 0-1 GHz). The wireless interface 412 may provide the downconverted signal to the processor 424. In one aspect, the wireless interface 422 may receive a baseband signal for transmission at a baseband frequency from the processor 414, and upconvert the baseband signal to generate a RF signal. The wireless interface 412 may transmit the RF signal through the antenna 418.

The processor 414 is a component that processes data. The processor 414 may be embodied as FPGA, ASIC, a logic circuit, etc. The processor 414 may obtain instructions from the memory device 416, and executes the instructions. In one aspect, the processor 414 may receive downconverted data at the baseband frequency from the wireless interface 412, and decode or process the downconverted data. For example, the processor 414 may generate audio data or image data according to the downconverted data. In one aspect, the processor 414 may generate or obtain data for transmission at the baseband frequency, and encode or process the data. For example, the processor 414 may encode or process image data or audio data at the baseband frequency, and provide the encoded or processed data to the wireless interface 412 for transmission. In one aspect, the processor 414 may set, assign, schedule, or allocate communication resources for different UEs 420. For example, the processor 414 may set different modulation schemes, time slots, channels, frequency bands, etc. for UEs 420 to avoid interference. The processor 414 may generate data (or UL CGs) indicating configuration of communication resources, and provide the data (or UL CGs) to the wireless interface 412 for transmission to the UEs 420.

The memory device 416 is a component that stores data. The memory device 416 may be embodied as RAM, flash memory, ROM, EPROM, EEPROM, registers, a hard disk, a removable disk, a CD-ROM, or any device capable for storing data. The memory device 416 may be embodied as a non-transitory computer readable medium storing instructions executable by the processor 414 to perform various functions of the base station 410 disclosed herein. In some implementations, the memory device 416 and the processor 414 are integrated as a single component.

In some implementations, communication between the base station 410 and the UE 420 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer(s).

Figures 5, 6:
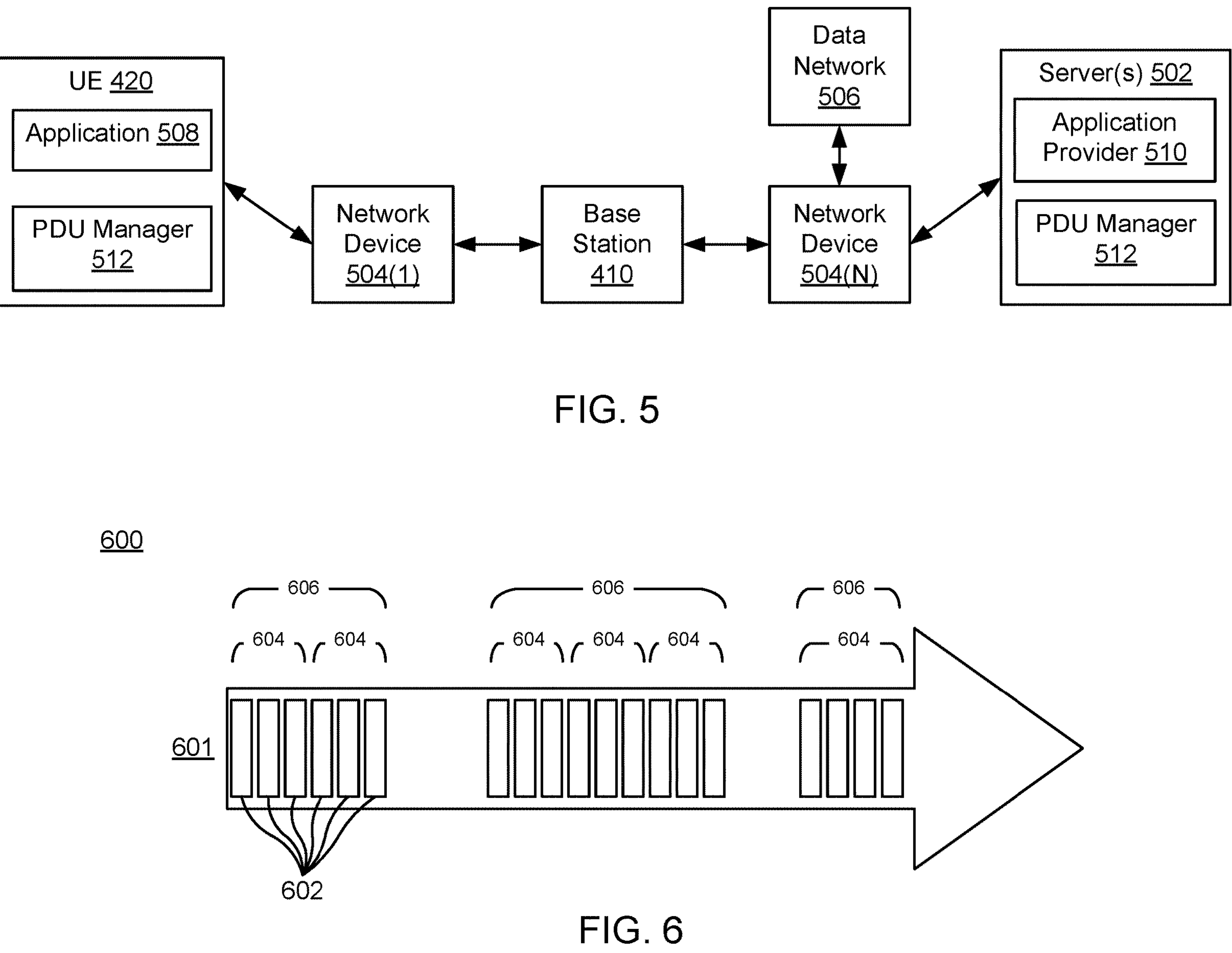
FIG. 5 is a block diagram of a system for network communications, according to an example implementation of the present disclosure.
FIG. 6 is a schematic diagram of protocol data unit (PDU) set communication as data bursts, according to an example implementation of the present disclosure.

Referring now to FIG. 5, depicted is a block diagram of a system 500 that can implement operations including facilitating prioritized data discard for wireless communication, according to an example implementation of the present disclosure. The system 500 may include user equipment (UE) 420 communicably coupled to one or more server(s) 502. The UE 420 may be the same as or similar to the UE 420 described above with reference to FIG. 4. The UE 420 may be communicably coupled to the server(s) 502 via various network devices 504 and base station 410. The base station 410 may be the same as or similar to the base station 410 described above with reference to FIG. 4. The network devices 504 may be or include any networking device, component, or node along the network path between the UE 420 and server(s) 502. For example, the network devices 504 may include routers, switches, or any other network nodes. In various implementations, the server(s) 502 may be configured to communicate with a data network 506 (e.g., a trusted data network 506) via a network exposure function and/or policy control function). The server(s) 502 may be configured to communicate data via a user plane function (UPF) to the base station 410 (e.g., a radio access network [RAN]), and the base station 410 may route the data from the server(s) 502 via various network devices 504 to the UE 420.

The UE 520 may be configured to execute an application 508 hosted by an application provider 510 on the server(s) 502. In various implementations, the application 508 may be an extended reality (XR) application (e.g., an augmented reality (AR), virtual reality (VR), mixed reality (MR), or other XR application). The application 508 executing on the UE 420 may generate data for transmission to the server 502 (and vice versa). The UE 420 (or server 502) may be configured to transmit the data along the network path shown in FIG. 5 and described above to the endpoint or destination (e.g., to the server 502 or UE 420).

A device or node along the network path may include a PDU manager 512. The PDU manager 512 may be or include any device, component, element, or hardware designed or configured to implement, deploy, use, or otherwise execute PDU set discarding, such as to selectively discard and/or process PDUs 602 of a PDU set 604 (e.g., as described with reference to FIGS. 6 and 7). While shown as included in the UE 420 and server(s) 502, in various implementations, each node (e.g., the network devices 504, base station 410, data network 506, etc.) may execute or include an instance of the PDU manager 512. In some implementations, the PDU manager 512 may be configured to execute a PDU-set delay budget (PSDB). The PSDB may define an upper bound for the time that a PDU set 604 may be delayed between two nodes of the network path (e.g., between the UE 420 and base station network device 504(1), network device 504(1) and base station 410, base station 410 and network device 504(N), and/or network device 504(N) and sever(s) 502). In various implementations, the PSDB may define an upper bound for the time that a PDU set 604 may be delayed for both downlink (DL) and/or uplink (UL) traffic. For certain cellular quality of service (QoS) identifiers (e.g., 5QI), the values for the PSDB for UL and DL traffic may be the same. In the case of network access, the PSDB may be used to support the configuration of scheduling and link layer functions. In some implementations, the PDU manager 512 may be configured to execute a PDU set discard time (PSDT). The PSDT may be an upper bound for the time that a PDU set 604 is to wait for transmission (e.g., in a buffer) at the sender of a link layer protocol before being discarded. Similar to the PSDB, the PSDT may be applied to both UL and DL traffic.

As described in greater detail below, the PDU manager 512 may be configured to selectively discard PDU sets 604 and/or data bursts 606 based on or according to the PDU set discard policy and/or data burst discard policy. For example, the PDU manager 512 may be configured to selectively discard PDU sets 604 and/or data bursts 606, based on or according to a count of PDUs 602 (e.g., of a PDU set 604 and/or of a data burst 606) received or otherwise identified by the PDU manager 512 within a time window. The time window may be, for example, set according to one of the discard policies. For instance, the time window may be a duration starting from receipt of a first PDU 602 of a PDU set 604. The PDU manager 512 may be configured to count the number of PDUs 602 received within the time window, and can apply the PDU set discard policy and/or data burst discard policy to the received PDUs 602, to selectively discard (or process) the PDU set 604 and/or data burst 606. The PDU manager 512 may be configured to discard the PDU set 604 and/or data burst 606 by deleting the PDU sets 604 (e.g., each PDU 602 which are linked to a common PDU set 604) or data burst 606 (e.g., each PDU set 604 sent in a common data burst 606) from memory, by removing the PDU sets 604 and/or data bursts 606 from a buffer, by dropping the PDU sets 604 and/or data bursts 606 from a transmission schedule for transmission, etc. The PDU manager 512 may be configured to process the PDU sets 604 (or data bursts 606) by transmitting the PDU sets 604 or data bursts 606 received from a buffer (e.g., from the application layer following the application 508 moving the PDU sets 604 to the buffer) to the next node along the network path, by pushing the PDU sets 604 (or data bursts 606) to the application layer for decoding and use by the application 508, etc.

Referring now to FIG. 6, depicted is a diagram of traffic flow 600 of a buffer 601 for data transmission from a sender device to a receiver device, according to an example implementation of the present disclosure. In some implementations, the sender device may be the UE 420 and the receiver device may be the server 502. In some implementations, the sender device may be a network device 504 and the receiver device may be the base station 410. In some implementations, the sender device may be the base station 410 and the receiver device may be the server 502 and/or the UE 420. In this regard, the sender device and receiver device may be or include any node along the network path shown in FIG. 5.

As shown in FIG. 6, the traffic flow 600 may include protocol data units (PDUs) 602 which may be grouped or otherwise sent in a PDU set 604. In some implementations, multiple PDU sets 604 may be sent in a data burst 606. In this regard, a sender device may generate a PDU set 604 including one or more PDUs 602. Each PDU 602 may include, contain, or otherwise carry various unit(s) of information generated at the application level (e.g., by the application 508, for example). For example, where the application 508 is an XR application, a PDU 602 may include a frame or video slice for the XR application. In some implementations, each of the PDUs 602 in the PDU set are needed by the application 508 (or the receiver device) to use the corresponding unit of information.

One or more PDUs 602 (and/or PDU sets 604) can be subject to timing criteria for transmission of the PDUs 602. For example, the PDU 602 can be subject to timing criteria such as a threshold duration (e.g., upper bound) that the PDU 602 is in a buffer (e.g., in the traffic flow 600) for transmission before being discarded, such that the PDU manager 512 can discard the PDU 602 responsive to an amount of time that the PDU 602 is in the buffer meeting or exceeding the threshold duration. This can be useful, for example, for latency-sensitive communications in which PDUs 602 may represent data that if not communicated in time may not be useful for a receiving device. XR data, such as video frames for XR, can be examples of such latency-sensitive communications for which the timing criteria and discard are useful. The timing criteria can include at least one of the PSDB or the PSDT. The UE 420 (e.g., PDU manager 512) can determine an indication of a remaining time that a given PDU 602 has to be in the buffer until the threshold duration of the timing criteria will be met or exceeded. For example, if the threshold duration is 80 ms, and the UE 420 determines that the given PDU 602 has been in the buffer for 50 ms, the UE 420 can determine the remaining time to be 30 ms.

Figure 7:
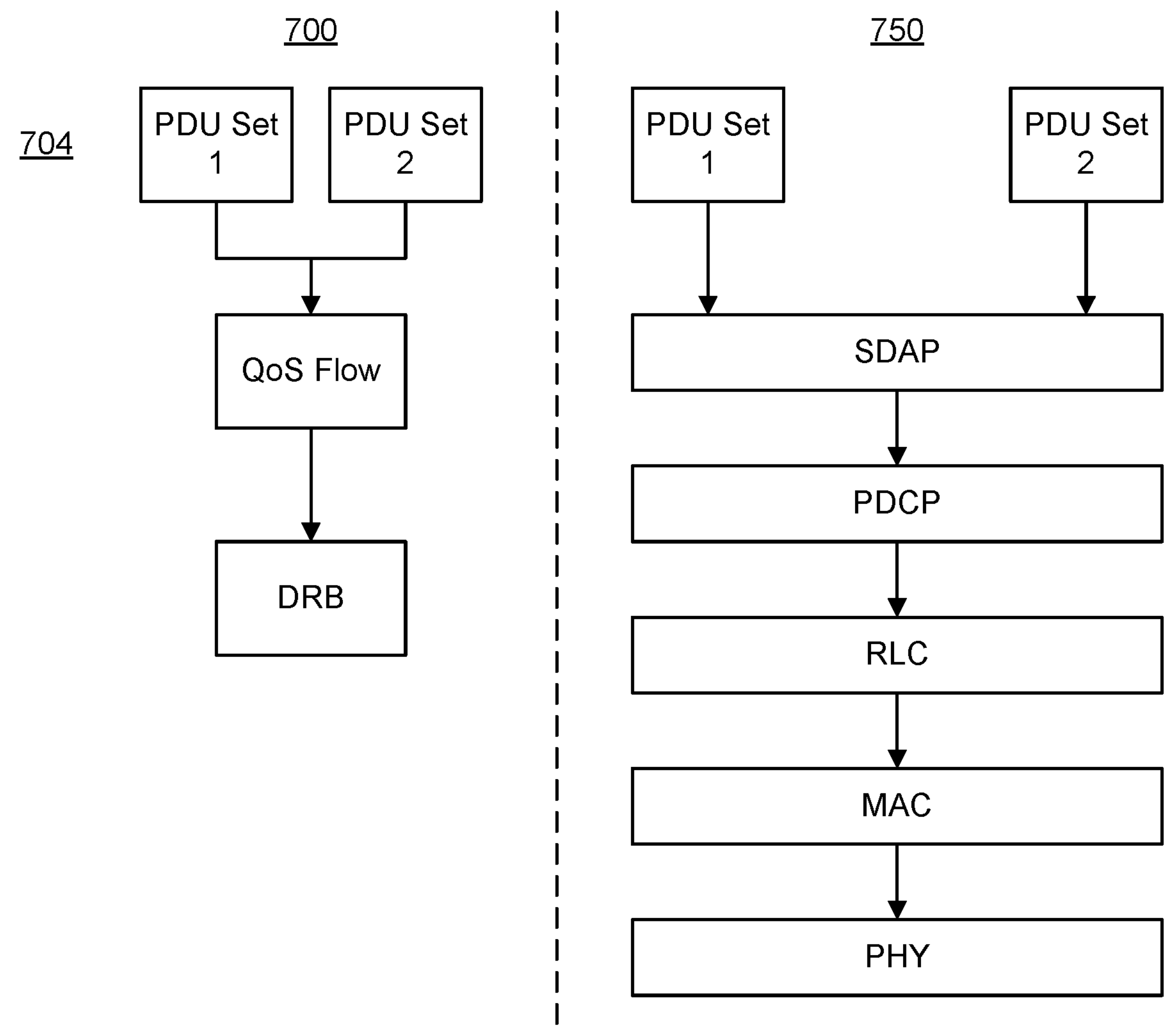
FIG. 7 is a diagram depicting PDU set communication allocation, according to an example implementation of the present disclosure.

FIG. 7 depicts examples of communication processes 700, 750 implemented by the UE 420 and/or base station 410 to facilitate mapping of network data communications (e.g., communications including PDU sets) to corresponding communication channels and/or entities, such as by timing information regarding one or more characteristics of PDUs, such as an importance score of the PDUs. For example, the processes 700, 750 can be performed to facilitate transmission of data of the traffic flow 600 in a manner that at least one of satisfies QoS requirements or reduces power consumption by the UE 420.

FIG. 7 depicts, for each communication process, data 704 arranged as PDU sets 1, 2. The data 704 can be for generating and presenting XR content (e.g., video frames) to a user of the UE 420. For example, the data 704 can represent XR data and/or sensor data used for generation of XR data. The application 508 can output the data 704 as one or more SDUs, which the PDU manager 512 can arrange as the PDU sets 1, 2, such as by assigning header information to a data element that includes the SDUs.

The PDU sets (e.g., one or more PDUs of the PDU set), can have a characteristic, which can indicate an importance or priority of the data 704 of the respective PDU sets. For example, the PDU sets 1, 2 can have importance scores (e.g., PDU set importance scores). In some implementations, the importance scores of the PDU sets are of an ordered set of values. For example, each respective PDU set 1, 2, can be assigned an importance score of a plurality of importance scores, such as N importance scores. The importance score can indicate a relative importance, such as a relative criticality or priority, of the PDU set relative to other PDU sets (e.g., based on the value of the importance score relative to higher/lower values). The PDU sets can represent data and/or control information to be communicated to remote devices via the base station 410.

As depicted in FIG. 7 for the communication process 700, the UE 420 (e.g., one or more communication layers of the OSI model as implemented by the UE 420, such as described with reference to FIG. 4) can assign the PDU sets 1, 2 to one or more corresponding QoS flows. For example, the UE 420 can assign the PDU set 1 and the PDU set 2 to the same QoS flow. In some implementations, the UE 420 assigns the PDU set 1 and the PDU set 2 to the same QoS flow responsive to one or more QoS parameters of the PDU set 1 and the PDU set 2 being the same or within a threshold difference of each other. The QoS parameters can include, for example, priority, error rate, delay budget, bit rate (e.g., guaranteed bit rate, prioritized bit rate), 5QI value (which can be associated with parameters such as priority, error rate, delay budget, etc., such as based on a given type of data presented by the PDU sets for the QoS flow), and/or allocation and retention priority (ARP). Each QoS flow can have a PDU set error rate, which can indicate a threshold tolerance for errors (e.g., bit error rate) for communication of the data 704 of the QoS flow, and can have a PDU set delay budget (PSDB), which can represent a threshold tolerance for delays in communication of data 704 of the PDU sets 1, 2 (e.g., for the UE 420 to cause discard of data 704 of the QoS flow responsive to the PSDB being exceeded for the data 704).

As such, the UE 420 can map different types of PDU sets, such as where the PDU set 1 represents an I frame and the PDU set 2 represents a P frame, to the same QoS flow responsive to the PDU sets 1, 2 having the same QoS parameter(s). For example, the UE 420 can multiplex audio and video into a single QoS flow (e.g., even where the PDU sets for audio and video have different importance). The UE 420 (e.g., the PDU manager 512) can assign the importance to a header of the PDU sets 1, 2, such as a GTP-U header. In some implementations, the UE 420 assigns a PDU Set Integration Indication (PSII) to one or more PDU sets. For example, the UE 420 can assign the PSII to a plurality of PDUs of a given PDU sets. The PSII can indicate whether the plurality of PDUs are to be used together, such as by a receiving application (e.g., such that if one or more PDUs of the plurality of PDUs are discarded, the remaining PDUs of the plurality of PDUs may not be useful).

In the communication process 700, the UE 420 can map the QoS flow to one or more respective data radio bearers (DRBs). The DRBs can be channels and/or endpoints of channels for communication of the data 704 of the QoS flows to respective receiving components. For example, the DRBs can transmit data 704 of the QoS flows for reception by the base station 410, such as to one or more channel components associated with the base station 410.

Referring further to FIG. 7, the UE 420 can perform a communication process 750 for transmission of the PDU sets 1, 2. At least some portions of the communication process 750 can be performed together with at least some portions of the communication process 700; for example, the layer communications of the communication process 750 can be used to implement the DRB communication and/or can continue from the DRB communication of the communication process 700.

As depicted in FIG. 7, the UE 420 can provide the PDU sets 1, 2 to a service data adaption protocol (SDAP) layer. The SDAP layer can perform the assignment of the PDU sets 1, 2 of the QoS flow to the DRB. The UE 420 can include a packet data convergence protocol (PDCP) layer to receive the PDU sets 1, 2 from the SDAP layer. The PDCP layer can manage communication of the PDU sets 1, 2, such as to perform discard of one or more PDUs and/or PDU sets responsive to expiration of one or more timers for the PDUs (e.g., responsive to expiration of the PSDT). In some implementations, the PDU manager 512 performs operations of the PDCP layer. The PDCP layer can output the PDU sets 1, 2 to a radio link control (RLC) layer, which can perform operations such as error correction and PDU arrangement (e.g., and without limitation, segmentation, duplicate detection, reordering). The RLC layer can output the PDU sets 1, 2 to a media access control (MAC) layer, which can perform operations such as controlling how PDU sets 1, 2 are assigned to a physical (PHY) layer, which can include hardware electronics for communication of the PDU sets 1, 2.

Referring further to FIG. 7, the PDU manager 512 (e.g., at the PDCP layer), can selectively discard at least a portion of the data 704 of the PDU sets 1, 2. For example, the PDU manager 512 can selectively perform discard based at least on a metric regarding the PDU sets 1, 2, such as based at least on an importance score of the respective PDU sets 1, 2. The PDU manager 512 can perform discard responsive to detection of a discard condition, such as responsive to one or more timing criteria (e.g., PSDT, PSDB) being triggered.

In some implementations, the PDU manager 512 performs discard responsive to detecting the discard condition to include a congestion condition. For example, the PDU manager 512 can monitor one or more parameters regarding wireless communication by the UE 420 or a wireless communication link of the UE 420 with a remote device (e.g., base station 410), and detect the congestion condition based at least on the one or more parameters. The one or more parameters can include, for example, at least one of a latency metric, a jitter metric, or a buffer metric. The buffer metric can include at least one of an amount of data in the buffer 601 or a delay of data being outputted from the buffer 601. The PDU manager 612 can apply one or more rules, functions, or models to the monitored one or more parameters to detect the congestion condition, such as to determine that congestion is present responsive to the at least one of the latency metric, the jitter metric, or the buffer metric meets or exceeds a corresponding threshold. In some implementations, the PDU manager 512 receives an indication of the congestion condition from a remote device, such as the base station 410, and detects the congestion condition responsive to receiving the indication.

As noted above, PDU sets of different importance, in some instances, can be mapped by the UE 420 to a same QoS flow and/or to a same DRB. As such, it can be challenging to perform discard operations on PDU sets, including under congestion conditions, in a manner that satisfies QoS criteria, as the assignment of PDU sets to the same QoS flow may be an insufficient indicator to effectively distinguish between data 704 to be buffered (e.g., maintained in the buffer 601 for transmission) or instead discarded.

Systems and methods in accordance with the present disclosure can use metrics regarding PDU sets, such as importance scores, to selectively perform discard operations (e.g., PDCP discard) of at least some PDUs of the PDU sets. In some implementations, the PDU manager 512 identifies, for a given PDU set, each SDU associated with the PDU set, and discard the identified SDU(s).

In some implementations, the PDU manager 512 determines whether to discard one or more PDU sets of a QoS flow based at least on the importance score of the one or more PDU sets. For example, the PDU manager 512 can identify an importance score threshold, and select one or more PDU sets of the QoS flow to discard responsive to the importance score of (each of) the one or more PDU sets being less than the importance score threshold. This can enable the PDU manager 512 to discard all data 704 having an importance less than the importance score threshold. For example, responsive to the PDU set 1 of FIG. 7 having a first importance score greater than the importance score threshold (and the discard condition being satisfied), the PDU manager 512 can determine to not discard the PDU set 1; responsive to the PDU set 2 of FIG. 7 having a second importance score less than the importance score threshold (and the discard condition being satisfied), the PDU manager 512 can determine to discard the PDU set 2.

In some implementations, the PDU manager 512 performs a weighted discard of PDU sets. This can allow the PDU manager 512 to more effectively direct sufficient data 704 for transmission, including under congestion and/or discard conditions, such as to increase the likelihood of (lost) data being recovered by a receiving entity (e.g., receiving application). For example, various applications can have processes to mitigate transmission losses, such as forward error correction (FEC), or passive error concealments through, for example, interpolation. By weighting the discard of PDU sets and/or data 704 thereof, such as to select portions of PDU sets to discard according to weighting based on importance, the PDU manager 512 can spread the data 704 to be discarded across various PDU sets, which can allow such transmission loss mitigation processes to be performed more effectively.

For example, the PDU manager 512 can select, for a given PDU set in a QoS flow, an amount of data 704 of the given PDU set, such as to select a portion of the given PDU set, to discard according to at least one of an importance score of the given PDU set or a value of the importance score relative to one or more importance scores of one or more other PDU sets of the QoS flow. The amount of data 704 to be discarded can be a dropping rate, such as a percentage of at least one of data 704 or PDUs of the given PDU set to discard.

Table 1 below provides an example of dropping rates for discard of data 704 of n PDU sets of a QoS flow, mapped to levels of importance (e.g., importance scores and/or relative scores) of the PDU sets, where IL_1 represents a level of importance of a most important PDU set, and IL_n represents a level of importance of a least importance PDU set: in order of importance score, IL_1>IL_2> . . . IL_(n−1)>IL_n.

TABLE 1

Mapping of PDU Set Importance to Dropping Rates During Discard Conditions.

| Level of Importance | Dropping Rate |
|---|---|
| IL_1 | D_1 = 0 percent |
| IL_2 | D_2 = 1 percent |
| . . . | . . . |
| IL_(n − 1) | D_(n − 1) = 5 percent |
| IL_n | D_n = 10 percent |

As shown for Table 1, for the n PDU sets of the QoS flow, responsive to detecting the discard condition, the PDU manager 512 can discard 0 percent of the PDU set having the IL_1 (most) importance (e.g., not discard any of the data 704), can discard 1 percent of the PDU set having the IL_2 (second most) importance, can discard 5 percent of the PDU set having the IL_(n−1) (second least) importance, and can discard 10 percent of the PDU set having the IL_n (least) importance. In some implementations, the PDU manager 512 discards up to the amount of data 704 indicated by the dropping rate, such as where not all the amount of discardable data as of the dropping rates is necessary given an amount of congestion present. In some implementations, the PDU manager 512 selects a subset of PDUs to discard from a given PDU set according to the dropping rate (e.g., for IL_n, discard up to ten percent of the PDUs).

In some implementations, the PDU manager 512 selects an amount of data 704 of the PDUs of the given PDU set according to the dropping rate. The PDU manager 512 can determine, for example, the amount of data 704 to discard randomly, such as by randomly selecting sub-elements of the PDUs of the given PDU set according to the dropping rate. This can allow the PDU manager 512 to randomize the amount of loss, weighted by the level of importance, which can facilitate loss recovery.

The PDU manager 512 can use the PSII to select PDUs for discard. For example, responsive to determining to discard a first PDU having the PSII, the PDU manager 512 can identify each other PDU having the same PSII as the first PDU, and discard the identified other PDU(s). In some implementations, the PDU manager 512 performs the identification of PDUs to which the PSII is assigned prior to determining the amount of data 704 to discard for each PDU set (e.g., prior to implementing the discard policy shown in Table 1), which can allow the PDU manager 512 to group additional PDUs for discard or to not be discarded according to each of the PSII and the discard policy; for example, where at least one PDU having the PSII has the IL_1 importance level, the PDU manager 512 can determine not to discard each PDU having the PSII (even if other PDUs having the PSII are associated with lesser importance scores than the at least one PDU). In some implementations, the PDU manager 512 does not evaluate the PSII prior to selection of data 704 to discard.

Figure 8:
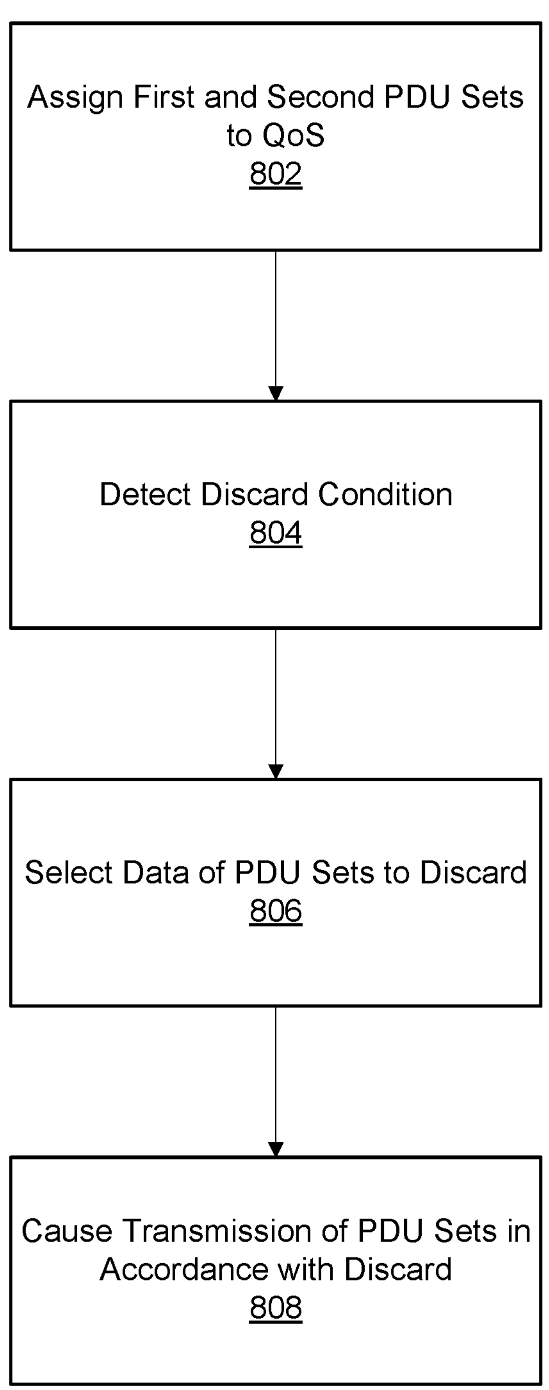
FIG. 8 is a flow chart of a method of prioritized discarding of data for wireless communications, according to an example implementation of the present disclosure.

FIG. 8 shows a flow diagram of a representative method 800 for discarding of PDU sets according to importance. In some implementations, the method 800 can be implemented by a device, such as a UE, configured to communicate with a second device, such as a base station, using a wireless connection. In some implementations, the method can be implemented for communication between UEs, or for communication from a base station to a UE. In brief overview, the method can include assigning 802 a first PDU set and a second PDU set to a QoS flow. The method can include detecting 804 a discard condition for communication of the data of the QoS flow to a remote device. The method can include causing 806 discard of at least a portion of the second PDU set based at least on an importance score of the second PDU set. The method can include causing 808 a wireless communication interface of the device to communicate the first PDU set and the non-discarded portion of the second PDU set. In some implementations, the method 800 can be performed by the wearable device 110 or the wearable device 150. In some implementations, the method 800 can be performed by other entities. In some implementations, the method 800 includes more, fewer, or different steps than shown in FIG. 8.

Referring to FIG. 8 in further detail, one or more processors of the device can assign 802 a first PDU set and a second PDU set to a QoS flow, e.g., to the same QoS flow. The PDU sets can include data packets, such as data packets to be communicated in bursts. The PDU sets can be generated by an application, such as an XR application, of the device, and or a communication layer of the device coupled with the application (e.g., PDCP layer). The PDU sets can be formatted as one or more PDUs, such as to be arranged as PDU sets for communication as one or more data bursts. For example, the one or more processors can generate the PDU sets to include multiple data packets representing video frame of XR data to be communicated in one or more data bursts (e.g., at a fixed periodicity). In some implementations, at least a subset of the PDU sets have a periodicity. For example, the PDU sets can have a fixed periodicity, such as by being generated and/or scheduled for communication at periodic times, e.g., in accordance with a frame rate associated with XR content represented by the PDU sets. The PDU sets can be arranged in data bursts, such as to have a plurality of first data packets forming a first data burst and a plurality of second data packets forming a second data burst, the first data burst having a first period between consecutive packets of the plurality of first data packets, the second data burst having a second period between consecutive packets of the plurality of second data packets, the first period and the second period each less than a third period between the first data burst and the second data burst. The PDU sets can represent XR data, such as for the first PDU set to represent an I frame, and the second PDU set to represent a P frame. In some implementations, the first PDU set represents image or video data, and the second PDU set represents audio data.

The first and second PDU sets can be assigned to the same QoS flow based at least on QoS parameters of the data of the PDU sets; for example, PDU sets having the same (or within a threshold) values for one or more QoS parameters can be assigned to the same QoS flow. In some implementations, the first and second PDU sets are assigned to the same DRB. In some implementations, the first and second PDU sets have different importance metrics (e.g., different values or levels of importance or importance score of a plurality of candidate values or levels), are assigned to the same QoS flow responsive to the first and second PDU sets having the same QoS parameters, and are assigned to the same DRB. For example, the first PDU set can have a first importance score, and the second PDU set can have a second importance score, such that the first PDU set is more important than the second PDU set.

The one or more processors can detect 804 a discard condition for communication of the data of the QoS flow to a remote device. The discard condition can include or be associated with congestion of network communications to and/or from the remote device. For example, the discard condition can correspond to bandwidth for communication to the remote device meeting a threshold, such as a nominal or maximum capacity. The discard condition can be detected based at least on one or more of latency, jitter, or a buffer metric associated with communication to the remote device. For example, the discard condition can be detected responsive to at least one of the latency or jitter exceeding a maximum threshold. The discard condition can be detected responsive to a capacity of a buffer for transmission of data being exceeding. The discard condition can be detected responsive to a remaining time for transmission of data from the buffer exceeding a remaining time threshold.

The one or more processors can cause 806 discard, responsive to the discard condition being detected, of at least a portion of the second PDU set according to the second importance score of the second PDU set. For example, due to the congestion condition and the second importance score being less than the first importance score of the first PDU set (such that the second PDU set is less important than the first PDU set (and may be less important than other PDU sets that the QoS flow may include)), the second PDU set can be selected to have at least the portion of data of the second PDU set be discarded. In some implementations, the one or more processors discard (e.g., determine not to transmit; remove from the buffer for transmission; delete from the buffer and/or a communication protocol or stack) all the data, such as all the PDUs of the second PDU set, responsive to determining to perform discard of the second PDU set. In some implementations, the one or more processors select data of the second PDU set to discard (or not discard) according to a PSII assigned to at least one PDU of the second PDU set.

In some implementations, the discard of at least the portion of the second PDU set is performed according to a weighted discard policy, such as by determining a dropping rate (e.g., discard rate) for selection of the portion of the data of the second PDU set to discard. For example, the importance score of the second PDU set can be compared with one or more importance scores of one or more other PDU sets of the QoS flow, and the dropping rate can be determined based at least on the comparison. For example, the dropping rate can indicate a percentage of the data and/or PDUs of the second PDU set to discard responsive to the second importance score of the second PDU set being a relatively low importance score.

The one or more processors can cause 808 a wireless communications interface to communicate PDU sets of the QoS flow in accordance with the discard caused for the second PDU set. For example, the one or more processors can map the non-discarded portion(s) of the first and second PDU sets, via a communication protocol and/or stack, to the wireless communications interface, such as to a physical layer of the transmitting device that includes the wireless communications interface. The one or more processors can cause the non-discarded portion(s) of the first and second PDU sets to be transmitted, by the wireless communications interface, for reception by the remote device.

Some implementations include electronic components, such as microprocessors, storage and memory that store computer program instructions in a computer readable storage medium (e.g., non-transitory computer readable medium). Many of the features described in this disclosure can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, the processors 316 can provide various functionality for the computing system 314, including any of the functionality described herein as being performed by a server or client, or other functionality associated with message management services.

It will be appreciated that the computing system 314 is illustrative and that variations and modifications are possible. Computer systems used in connection with the present disclosure can have other capabilities not specifically described here. Further, while the computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the implementations disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary implementation, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or implementation, and references to "an implementation," "some implementations," "one implementation" or the like are not necessarily mutually exclusive and are intended to indicate that a particular feature, structure, or characteristic described in connection with the implementation can be included in at least one implementation or implementation. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary implementations, and that such variations are intended to be encompassed by the present disclosure.

What is claimed is:

1. A device comprising:

a wireless communications interface; and one or more processors to:

detect a congestion condition for communication of a quality of service (QoS) data flow to which each of a first protocol data unit (PDU) set and a second PDU set are assigned, the first PDU set having a first importance score, the second PDU set having a second importance score less than the first importance score; and cause, responsive to detecting the congestion condition, for communication of the QoS data flow by the wireless communications interface, discard of at least a portion of the second PDU set.

2. The device of claim 1, wherein the one or more processors are to detect the congestion condition according to at least one of a latency metric, a jitter metric, or a buffer metric.

3. The device of claim 1, wherein the one or more processors are implemented by at least one of a user equipment device or a network device.

4. The device of claim 1, wherein the one or more processors are to cause the discard of at least the portion of the second PDU set according to a weighting criteria corresponding to the second importance score.

5. The device of claim 1, wherein the QoS data flow comprises a plurality of data packets for sequential communication, each of the data packets comprising a respective first PDU set and second PDU set.

6. The device of claim 1, wherein the first PDU set comprises a P frame of an image, and the second PDU set comprises an I frame of the image.

7. The device of claim 1, wherein the first PDU set data element represents video information, and the second PDU set represents audio information.

8. The device of claim 1, wherein the one or more processors are to:

assign the QoS flow to a same packet data convergence protocol (PDCP) layer responsive to assigning the first PDU set and the second PDU set to the QoS flow, and perform the discard of at least the portion of the second PDU set at the PDCP layer.

9. The device of claim 1, wherein the second PDU set comprises the portion and a non-discarded portion, and the one or more processors are to cause communication of the non-discarded portion of the second PDU set.

10. The device of claim 1, wherein the one or more processors are to:

select, according to the second importance score, an amount of the portion of the second PDU set to discard, the amount less than all data of the second PDU set.

11. A system, comprising:

one or more processors to:

detect a discard condition for communication of a quality of service (QoS) data flow having a first protocol data unit (PDU) set and a second PDU set, the first PDU set having a first importance, the second PDU set having a second importance less than the first importance; and cause, responsive to detecting the discard condition and based at least on the second importance being less than the first importance, for communication of the QoS data flow, discard of at least a portion of the second PDU set.

12. The system of claim 11, wherein the one or more processors are to detect the discard condition according to at least one of a latency metric, a jitter metric, or a metric for an amount of time for maintaining the first PDU set and the second PDU set in a buffer for transmission.

13. The system of claim 11, wherein the one or more processors are implemented by at least one of a user equipment device or a network device.

14. The system of claim 11, wherein the one or more processors are to cause the discard by selecting the portion of the second PDU set to discard according to a weighting criteria associated with the second importance.

15. The system of claim 11, wherein the first PDU set comprises a P frame of an image, and the second PDU set comprises at least one of an I frame of the image or audio data associated with the image.

16. The system of claim 11, wherein the first PDU set represents video information, and the second PDU set represents audio information.

17. The system of claim 11, wherein the one or more processors are to:

assign the QoS data flow to a same packet data convergence protocol (PDCP) layer responsive to assigning the first PDU set and the second PDU set to the QoS data flow, and performs the discard of at least the portion of the second PDU set at the PDCP layer.

18. A method, comprising:

detecting, by one or more processors, a congestion condition for communication of a quality of service (QoS) data flow having a first protocol data unit (PDU) set and a second PDU set, the first PDU set having a first importance score, the second PDU set having a second importance score less than the first importance score; and causing, responsive to detecting the congestion condition, for communication of the data flow, discard of at least a portion of the second PDU set.

19. The method of claim 18, wherein detecting the congestion condition comprising evaluating, relative to at least one threshold, at least one of a latency metric, a jitter metric, or a buffer metric.

20. The method of claim 18, comprising randomly selecting, by the one or more processors, the portion of the second PDU set to discard according to a discard rate associated with the second importance score.

* * * * *